US008699692B2

(12) United States Patent
Baumeister et al.

(10) Patent No.: US 8,699,692 B2
(45) Date of Patent: *Apr. 15, 2014

(54) SYSTEM AND METHOD FOR PROCESSING AND ROUTING INCOMING CALLS TO A COMMUNICATION ASSISTANCE SYSTEM

(75) Inventors: Christine Baumeister, Harleysville, PA (US); Michael Bates, Bethlehem, PA (US); Robert Pines, New York, NY (US)

(73) Assignee: Grape Technology Group, Inc., Bethlehem, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/525,517

(22) Filed: Jun. 18, 2012

(65) Prior Publication Data
US 2013/0150009 A1 Jun. 13, 2013

Related U.S. Application Data

(63) Continuation of application No. 10/748,837, filed on Dec. 29, 2003, now Pat. No. 8,254,556.

(51) Int. Cl.
*H04M 3/00* (2006.01)
*H04M 5/00* (2006.01)
*H04M 7/00* (2006.01)

(52) U.S. Cl.
USPC ............ 379/265.02; 379/265.01; 379/221.01; 379/221.03; 379/221.04

(58) Field of Classification Search
USPC ............ 379/265.01, 265.02, 265.03, 265.04, 379/265.05, 265.06, 265.07, 265.08, 379/265.09, 265.1, 265.11, 265.12, 265.13, 379/265.14, 266.01, 266.02, 266.03, 379/266.04, 266.05, 266.06, 266.07, 379/266.08, 266.09, 266.1
See application file for complete search history.

(56) References Cited

U.S. PATENT DOCUMENTS

| | | | |
|---|---|---|---|
| 4,284,852 A | 8/1981 | Szybicki et al. |
| 4,620,066 A | 10/1986 | Bushnell et al. |
| 4,669,113 A | 5/1987 | Ash et al. |
| 4,737,983 A | 4/1988 | Frauenthal et al. |
| 4,788,721 A | 11/1988 | Krishnan et al. |
| 4,942,602 A | 7/1990 | Baker et al. |
| 4,949,373 A | 8/1990 | Baker et al. |
| 4,979,118 A | 12/1990 | Kheradpir |
| 5,068,892 A | 11/1991 | Livanos |
| 5,142,570 A | 8/1992 | Chaudhary et al. |
| 5,153,909 A | 10/1992 | Beckle et al. |
| 5,164,983 A | 11/1992 | Brown et al. |
| 5,168,515 A | 12/1992 | Gechter et al. |

(Continued)

FOREIGN PATENT DOCUMENTS

EP   0823809   2/1998

*Primary Examiner* — Khai N Nguyen
(74) *Attorney, Agent, or Firm* — Sofer & Haroun, LLP

(57) ABSTRACT

A call routing system employs a primary call outing device configured to receive directory assistance calls from callers at a first directory assistance system, and determines, for each of the calls, whether they will be handled by the first directory assistance system, or by a second directory assistance system among a plurality of directory assistance systems. A secondary router is also provided, configured to route the calls within the first directory assistance system to the primary call routing device The secondary router has a default call distribution logic, such that if the primary call routing device is off-line, the secondary call router routes the calls among the first directory assistance system and the plurality of directory assistance systems according to the default distribution logic.

7 Claims, 4 Drawing Sheets

(56) References Cited

U.S. PATENT DOCUMENTS

| | | |
|---|---|---|
| 5,271,058 A | 12/1993 | Andrews et al. |
| 5,295,183 A | 3/1994 | Langlois et al. |
| 5,299,259 A | 3/1994 | Otto |
| 5,384,841 A | 1/1995 | Adams et al. |
| 5,530,744 A | 6/1996 | Charalambous et al. |
| 5,590,188 A | 12/1996 | Crockett |
| 5,680,448 A | 10/1997 | Becker |
| 5,684,870 A | 11/1997 | Maloney et al. |
| 5,724,419 A | 3/1998 | Harbuziuk et al. |
| 5,754,639 A | 5/1998 | Flockhart et al. |
| 5,787,163 A | 7/1998 | Taylor |
| 5,835,696 A | 11/1998 | Hess |
| 5,850,433 A | 12/1998 | Rondeau |
| 5,915,012 A | 6/1999 | Miloslavsky |
| 5,920,621 A | 7/1999 | Gottlieb |
| 5,940,483 A | 8/1999 | Shaffer et al. |
| 5,943,611 A | 8/1999 | Molne |
| 5,978,671 A | 11/1999 | Foladare et al. |
| 5,987,471 A | 11/1999 | Bodine et al. |
| 6,009,323 A | 12/1999 | Heffield et al. |
| 6,038,308 A | 3/2000 | Anthos et al. |
| 6,055,307 A | 4/2000 | Behnke et al. |
| 6,108,646 A | 8/2000 | Mohri et al. |
| 6,195,359 B1 * | 2/2001 | Eng et al. ............ 370/401 |
| 6,229,888 B1 | 5/2001 | Miloslavsky |
| 6,233,333 B1 | 5/2001 | Dezonmo |
| 6,320,943 B1 | 11/2001 | Borland |
| 6,366,668 B1 * | 4/2002 | Borst et al. ............ 379/266.04 |
| 6,396,920 B1 | 5/2002 | Cox et al. |
| 6,490,350 B2 | 12/2002 | McDuff et al. |
| 6,625,275 B1 | 9/2003 | Miyauchi |
| 6,714,642 B2 * | 3/2004 | Dhir et al. ............ 379/265.02 |
| 6,744,858 B1 | 6/2004 | Ryan et al. |
| 6,801,619 B1 | 10/2004 | Bae |
| 6,813,634 B1 | 11/2004 | Ahmed |
| 6,816,584 B1 | 11/2004 | Armstrong et al. |
| 6,845,155 B2 | 1/2005 | Elsey |
| 7,043,006 B1 * | 5/2006 | Chambers et al. ...... 379/265.02 |
| 7,962,644 B1 * | 6/2011 | Ezerzer et al. ......... 709/238 |
| 2002/0054670 A1 | 5/2002 | Shtivelman |
| 2002/0184069 A1 | 12/2002 | Kosiba et al. |
| 2003/0037113 A1 * | 2/2003 | Petrovykh ............ 709/205 |
| 2003/0108162 A1 * | 6/2003 | Brown et al. ............ 379/88.01 |
| 2003/0125084 A1 | 7/2003 | Collins |
| 2005/0025303 A1 * | 2/2005 | Hostetler ............ 379/265.02 |
| 2005/0074114 A1 * | 4/2005 | Fotta et al. ............ 379/266.08 |

* cited by examiner

SYSTEM AND METHOD FOR PROCESSING AND ROUTING INCOMING CALLS TO A COMMUNICATION ASSISTANCE SYSTEM

RELATED APPLICATION

This application is a continuation of U.S. patent application Ser. No. 10/748,837, filed on Dec. 29, 2003, the entirety of which is incorporated by reference.

FIELD OF THE INVENTION

The present invention is directed to a communication assistance system and method. More particularly, the present invention is directed to a system and method for processing and routing incoming calls to a communication assistance system.

DESCRIPTION OF THE RELATED ART

One drawback of current directory assistance systems arises when a high number of calls from customers, such as a wireline or wireless service providers are delivered to a directory assistance system. The incoming calls to the directory assistance system, typically are forwarded to any one of a plurality of customer service agents in order to handle each of the incoming calls. In such cases call distribution may be employed to load balance the incoming calls between the customer service agents to ensure maximum call volume processing. Typically, call distribution is carried out using a series of routers and connectivity modules such that incoming calls are parsed and sent through the routers according to a set distribution logic and distributed accordingly to the appropriate customer service agent.

However, in such directory assistance systems, certain call centers for handling directory assistance calls can become overwhelmed when experiencing a surge in callers attempting to seek directory assistance from a single designated call center. For example, when a directory assistance call center experiences excessive call volume, and there are insufficient customer service agents at that call center to properly handle all of the calls, callers may begin experiencing problems, including, but not limited to, excessive delays before being connected to a customer service agent, connection to operators not equipped to handle particular calls (such as direction requests), and slow response time from directory assistance computers at the operator terminals.

OBJECT AND SUMMARY OF THE INVENTION

The present invention looks to overcome the drawbacks associated with the prior art systems and advantageously provide a system and method which facilitates the efficient distribution of incoming calls to customer service agents by distributing calls between a number of connected call centers, so that, a particular call center experiencing a high volume of calls can defer a number of calls to a second call center, better situated to handle the overflow calls.

It is one object of the present invention to provide for a redundant load balancing system that is capable of distributing calls from a first call center, experiencing high call volume to one or more other call centers, better situated to receive the overflow callers. The redundancy of the system provides both an intelligent distribution as well as default distribution arrangements, should certain load balancing components fail to operate properly under high volume call stress.

Yet another object of the present invention is to provide a directory assistance system that is capable of recognizing frequent callers to the system so as to provide certain advantages to those callers, which enhances the speed and quality with which their calls are handled.

To this end, a directory assistance system for either landline or wireless listings employs a primary call routing device, configured to receive directory assistance calls from callers at a first directory assistance system. The primary call routing device then determines, for each of the calls, whether the calls will be handled by the first directory assistance system, or by a second directory assistance system among a plurality of directory assistance systems.

A secondary router is provided, configured to route the calls within the first directory assistance system to the primary call routing device. The secondary router has a default call distribution logic, such that if the primary call routing device is off-line, the secondary call router routes the calls among the first directory assistance system and the plurality of directory assistance systems according to the default distribution logic.

BRIEF DESCRIPTION OF THE DRAWINGS

For the purpose of illustrating the invention, there are shown in the drawings several forms, which are presently preferred, it being understood, however, that the invention is not limited to the precise arrangements and instrumentalities shown.

DETAILED DESCRIPTION OF EMBODIMENTS OF THE INVENTION

Figure 1:
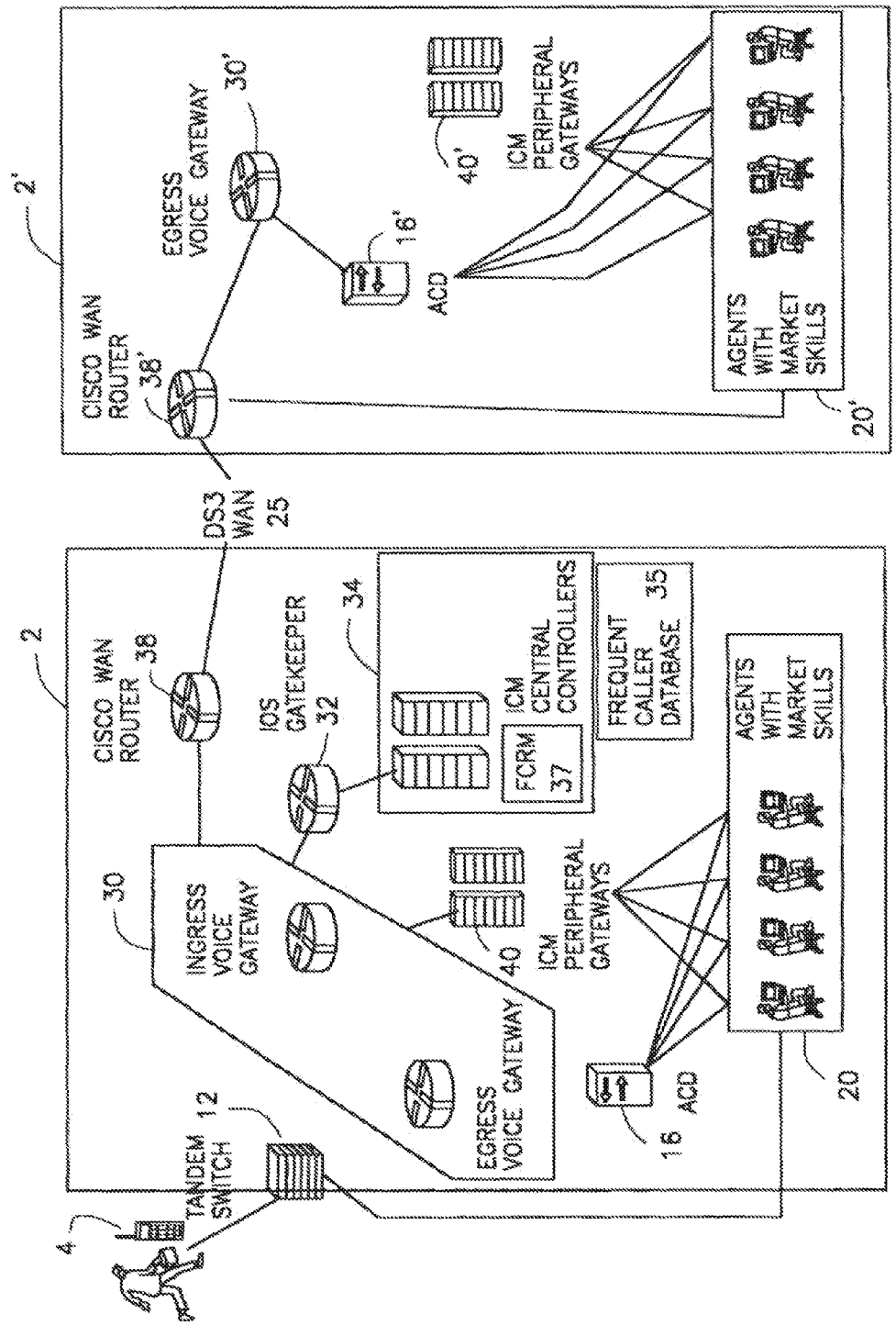
FIG. 1 is an overview diagram of a directory assistance system, in accordance with one embodiment of the present invention.
Figure 2:
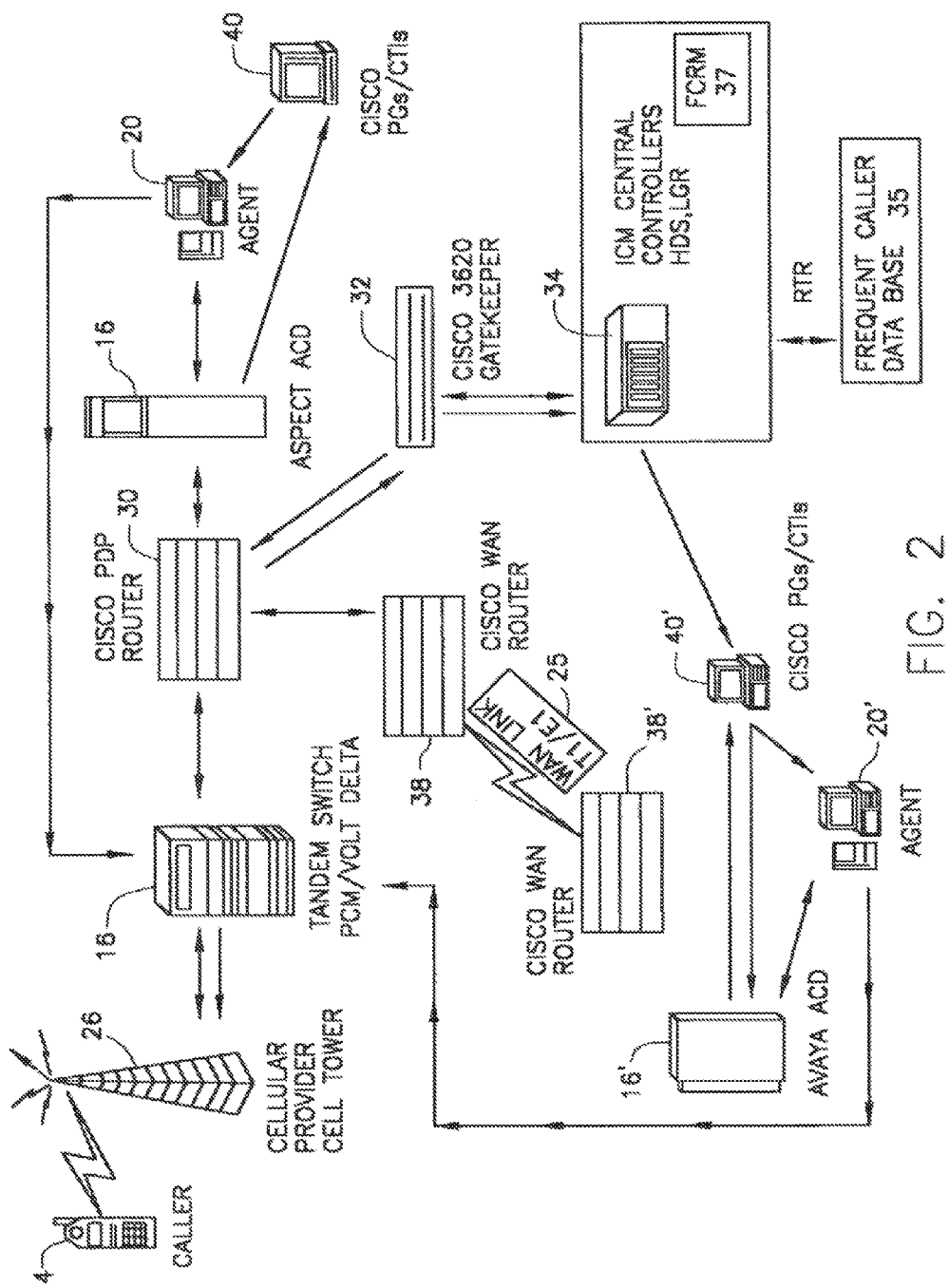
FIG. 2 is a system diagram of a directory assistance system, in accordance with one embodiment of the present invention.

Referring now to the drawings, wherein like reference numerals refer to like elements, there is shown in FIGS. 1 and 2, a communication assistance system 2 in accordance with one embodiment of the present invention. System 2 allows a caller 4 receive information about or to initiate communications with a requested device 6.

Requested device 6 can refer to any device, to which the connection number is stored within system 2 such as a wireless or wireline telephone device, and is used throughout the application to refer to the device that caller 4 intends to contact. Both the device used by caller 4 and requested device 6 are not limited with respect to telephone devices but can be any device capable of receiving communications such as PDA's, e-mail pagers, RIM Blackberry devices, PCM phones and modems, Wifi devices, SMS, IM devices or IP telephony devices, or any other communication device capable of having an "addressing" code stored in directory assistance system 2. For illustrative purposes, requested device 6 will be described as a telephone device throughout the application.

Communication assistance system 2 is preferably coupled to one or more service providers 26 directly through wireless MSCs (Mobile Switching Centers) or via the public switched telephone network (PSTN). However it is noted that communication with system 2 by caller 4 is not limited in this respect. For example caller 4, contacting system 2 via, SMS, E-mail, IM, or any other IP protocol is also within the contemplation of the present invention.

As shown in FIGS. 1 and 2, system 2 is preferably comprised of one or more tandem switches and integrated voice response units (VRU) 12 (the VRU may be standalone instead of integrated as described above), a POP (Point of Presence) router 30, an IOS (Input Output Supervisor) gatekeeper 32, one or more ICM (Internet Control Message Protocol) central controllers 34, a frequent caller database 35, a frequent caller routing module, a WAN router 38, a primary call center 16, such as an ACD system (Automatic Call Distribution), computer telephone interface device/peripheral gateways devices 40, and agent terminals 20.

In a preferred embodiment of the present invention a plurality of call centers such as system 2 and system 2', illustrated in FIGS. 1 and 2, can be strategically located in various geographic locations across the country. For example, each call center, system 2 or system 2' can be located in a major metropolitan area spread across the United States. Each call center is configured to handle the call traffic that is designated for that call center which could include all possible type of calls. As illustrated in FIGS. 1 and 2, directory assistance system 2 and system 2 are preferably connected across a WAN (Wide Area Network) 25, using WAN routers 38 and 38'.

It is noted that directory assistance system 2 and system 2' may be located in close proximity to one another or they may be set apart at great geographic distances, connected via WAN 25. The geographic distance between system 2 and system 2' does not affect the operation of the present invention.

For the purposes of illustration, each directory assistance system 2 and system 2' maintain similar components modules. As such, component modules designated as Automatic Call Distribution (ACD) primary call center 16', peripheral gateways 40', operator terminals 20', and any other module designated with "#'", are all understood as being component modules of system 2' respectively. Likewise, for the purpose of illustration all internal components are described with respect to directory assistance system 2, however it is understood that the descriptions are equally applicable to the description of the corresponding components of system 2'.

The links coupling the various components of system 2 together and with service providers 26 via Mobile Switching Centers (MSCs) and the Public Switched Telephone Network (PSTN) can be any known voice and/or data communication technologies, including wide area networking and local area networking communication technologies. For example, digital subscriber lines (DSL), digital T-1s, leased lines, satellite or wireless links, Integrated Services Digital Network (ISDN) circuits, asynchronous transfer mode (ATM), Ethernet, token ring, fiber distributed-data interface (FDDI) and the like may be employed. It is also presumed that the various components of system 2, service providers 26 and PSTN 10 are arranged with appropriate communication hardware interfaces to transmit and receive data across the communication links.

For example, wireless service providers 26 may interface directly with system 2 via Mobile Switching Centers (MSCs) hardware coupled directly to tandem switch 12 of system 2. Tandem switches 12 can be any switch that preferably includes an integrated voice response unit. Many functions performed by tandem switch 12 are known to those of ordinary skill in the art and include telephone call routing between trunks, converting one signaling type to another, such as between a digital signaling system, dual-tone multi-frequency (DTMF) signaling, multi-frequency (MF) signaling, ISDN, SS7, etc., and capturing call length and destination data for billing, etc.

It is noted that tandem switch 12 is only one example of an access point to directory assistance system 2, however, this in no way is intended to limit the scope of the present invention. For example, any commonly used IP or telephony access points such as direct IP routers, and DAX™ CTI (Computer Telephony Interface) platforms, are also within the contemplation of the present invention. For the purposes of illustration, tandem switch 12 is used throughout as the primary access point for directory assistance system 2.

In one embodiment of the present invention, as illustrated in FIGS. 1 and 2, a secondary router 30, such as POP router 30 can be any router capable of directing incoming calls from tandem switch 12 to other components within system 2 such as Input Output Supervisor (IOS) Gatekeeper 34, WAN router 38 and Automatic Call Distribution (ACD) primary call center 16. POP router 30 principally acts as both an ingress and egress voice gateway receiving incoming calls from tandem switch 12, and routing them to either ACD primary call center 16 or to WAN router 38 according to load balancing instructions received either from the ICM central controllers 34, or as directed from internal logic controls within POP router 30 itself, when ICM central controllers 34 are not functioning properly. Both scenarios are discussed in further detail below. Typical POP routers 30 used for this application include Cisco™ 5400 Routers.

It is noted that POP router 30 is a secondary router 30 within directory assistance system 2. For the purposes of illustration secondary router 30 is discussed in the form of POP router 30, however any other secondary router performing similar functions within a similar directory assistance system are also within the contemplation of the present invention.

IOS gatekeeper 32, such as Cisco™ gatekeeper, acts principally as a translator between IP (interact Protocol) communications coming from POP router 30 and ICM (Internet Control Message) Protocol messages, which are in turn output to ICM central controllers 34.

Primary call routing device 34 such as ICM central controllers 34 are the modules within system 2, employed to receive incoming calls to directory assistance system 2 and to determine whether each call will be handled by operator terminals 20 within system 2 or by a remotely located operator terminal 20' in directory assistance system 2'.

ICM central controllers 34 process the calls using GKTMP (Gatekeeper Transaction Message Protocol) then parse the DID (Direct Inward Dialing) and, using scripts, bases its load balancing or call routing decisions on such criteria as agent skills, agent available for the longest time, average hold times etc. However, ICM central controllers 34 are not limited in this respect. ICM central controllers 34 making call routing decisions using any applicable protocol and utilizing any available criterion is within the contemplation of the present invention.

One additional method for routing and handling of incoming calls includes preferential or priority routing of calls within directory assistance system 2 based on a designation of frequent caller status for a particular caller 4.

For example, when making a call routing decision, ICM central controllers 34, in addition to taking into account total call traffic volumes to system 2, may utilize frequent caller router module 37, located within, so as to evaluate the status of a caller 4 by contacting frequent caller database 35. Frequent caller database 35 is configured to store a directory of callers 4 and the number of times those callers have contacted system 2 for some form of directory assistance.

In addition to storing the identities of caller 4 and the number of times they have contacted system 2, frequent caller database 35 maintains a group identification structure, separating frequent callers into groups such as ≤100 calls per month for Group I, ≤90 calls per month for Group II, ≤80 calls per month for Group III and so on.

The criterion for group designations shown is only one example of a group designation method, however this is not intended to limit the scope of the present invention. For example, group designations can be based on any number of criteria including but not limited to, calls per time frame, total calls to system 2, pay based designations and carrier based designations.

Group designations based on calls per time frame, as discussed above, where first group designation requires the frequent caller to make a certain number of calls to directory assistance system 2 per month, per day, or per year. Group designations based on total calls to the system is preferential to long time frequent callers who use directory assistance system 2 in periodic bursts, rewarding long time callers with a lame number of total calls to system 2. Group designations based on payment can simply add premium costs to certain caller's billing in order to have themselves designated as priority customers within frequent caller database 35, regardless of the actual number of times they have actually contacted system 2. Likewise, group designation based on carrier, would also work in similar fashion, as either a bonus feature offered by the carrier, or, offered at a premium cost through the carrier, such that the caller is designated as priority customers, regardless of the actual number of times they have contacted system 2.

When making a routing decision for an incoming caller 4, frequent caller routing module 37 of ICM central controllers 34 is able to access frequent caller database 35 and provide priority routing to a number of callers based on their respective group within database 35. Ideally, 3-5% of the total call volume from callers 4 to directory assistance system 2 should receive priority routing. To accomplish this, frequent caller routing module 37 dynamically determines the number of group designations stored in frequent caller database 35 that should be given priority routing such that 3-5% of the total volume of callers 4 are routed as priority callers.

For example, frequent caller routing module 37 may designate groups I and II from frequent caller database 35 as priority. However, if this designation results in an excess of 5% of the total call volume to directory assistance system 2 being handled with priority routing, then frequent caller routing module 37 dynamically removes Group II from priority calls, lowering the percentage of total calls being routed as priority calls until the priority routing returns to the 3-5% range. Likewise, if when Groups I and II are being routed as priority calls through directory assistance system 2, and the number of calls being handled as priority falls below 3% of the total call volume to system 2, then frequent caller routing module 37 may dynamically add frequent callers 34 from Group III in database 35 as priority callers, increasing the percentage of total calls handled as priority muting up to the 3-5% range.

Any similar dynamic designation of priority call routing by ICM central controller 34 within a similar directory assistance system 2 is within the contemplation of the present invention. It is noted that frequent caller routing module 37 is listed as an independent module within ICM central controller 34 however, this is in no way intended to limit the scope of the present invention. For example, a separately located frequent caller routing module 37 as well as a frequent caller routing module software application, integral within ICM central controllers 34, are also within the contemplation of the present invention.

Once a caller 4 has been designated by frequent caller routing module 37 to be handled by priority routing, ICM central controllers 34 can route their call in several priority manners. For example, a call designated as priority may be directed to a particular operator terminal 20 having an increased skill level. Another example of priority routing is that a call can simply be moved or given a higher ranking in the queue for the next available operator terminal 20. Yet another example of priority call routing would be to designate an entire directory assistance system 2, such as directory assistance system 2' for exclusively servicing priority callers 4.

In addition to these prior routing options, combinations of these options may also be employed. For example, a call designated as priority may be directed to a higher ranking in the queue, but if the wait time is still excessive, the call me be routed to entirely different call center to a more experienced customer service agent. Any combination of the priority routing service with one another are within the contemplation of the present invention.

The entire purview of priority call routing advantages that can be used for priority treatment of a particular group of callers 4 is to vast to discuss in complete detail. However, it is understood that any similar priority call routing advantages provided in a similar directory assistance system 2, based on frequent caller status, are also within the contemplation of the present invention.

As discussed above, ICM central controllers 34 are required in directory assistance system 2 in order to both allow smooth handling of a larger volume of incoming calls as well as smooth handling of priority callers 4 and assuring that they are handled by an appropriate customer service agent at an operator terminal 20. For example, as directory assistance calls are received at system 2, ICM central controllers 34 and frequent caller routing module 37, using internal logic determine which of the operator terminals 20 will handle each respective call. As call volume at the particular directory assistance system 2 increases by capacity or as frequent callers 4 contact system 2, ICM central controllers 34 and frequent caller routing module 37, employing their call distribution logic, seamlessly begins transferring a portion of the incoming calls across WAN 25 to be handled by operator terminals 20' at other directory assistance systems 2'.

Such a component is essential for maintaining optimal call distribution so as to provide the highest level of service available to the various frequent callers 4. The distribution of incoming calls by ICM central controller 34 are discussed in more detail below.

It is noted that central controller 34 is a primary call routing device 34 within directory assistance system 2. For the purposes of illustration primary call routing device 34 is discussed in the form of ICM central controllers 34, however any other primary router performing similar functions within a similar directory assistance system are also within the contemplation of the present invention.

Transfer router 38, such as WAN router 38, within directory assistance system 2, is configured to transmit calls via WAN 25 between directory assistance system 2 and remotely located directory assistance systems 2'. In situations where system 2 decides for a particular call to he handled by operator terminals 20' at another system 2', WAN router 38 receives the incoming call from POP router 30 and transfers it to a corresponding WAN router 38' in system 2' for further handling of the call. Such a decision for transferring calls between directory assistance system 2 and system 2' can either be made actively by primary call routing device/ICM central controllers 34 or it can be made by secondary router/POP router 30, when ICM central controller 34 is not functioning properly. Typical examples of WAN router 38 include Cisco 7200 series routers.

It is noted that WAN router 38 is a transfer router 38 within directory assistance system 2. For the purposes of illustration transfer router 38 is discussed in the form of WAN router 38 however any other primary router performing similar functions within a similar directory assistance system are also within the contemplation of the present invention.

Primary ACD call center 16 is comprised of hardware and software which accept inbound calls from tandem switches 12, via POP router 30 and distributes the calls to multiple operator terminals 20 using standard Automatic Call Distribution (ACD) technology.

Primary ACD call center 16 can be comprised of one or more processors coupled together in a networked arrangement accomplish these functions, and can be constructed using known computing technology such as using personal computers, mini or mainframe computing devices, routers, switches and the like. Such an arrangement and operation of call center 16 is understood to also include the function and construction of primary ACD call center 16' as well.

Internet Control Message protocol peripheral gateways 40 are configured to act as computer telephony interfaces (CTI) and are disposed between primary ACD call center 16 and operator terminals 20. Peripheral gateways 40 are configured to monitor the status of operator terminals 20, checking for operator availability. Once an operator terminal 20 is selected for servicing the call, peripheral gateways 40 route the data portion of the incoming call, such as the number dialed by the requester and the originating phone number of the requester to operator terminal 20. It is noted that the voice portion of the call is transmitted directly between primary ACD call center 16 and operator terminals 20.

While not discussed here, it is contemplated within the context of this invention that the data portion of an incoming requester 4 call could be sent to operator terminal 20 using in-band signaling (i.e., with the voice path of the call) as well.

Operator terminals 20 can also be any known computing device capable of receiving and displaying data on its display, including but not limited to a personal computer, UNIX workstation and the like. Although it is preferred that a separate customer service representative telephone be implemented as part of directory assistance system 2 and coupled to primary ACD call center 16 for communicating with caller 4, operator terminal 20 is not limited to this arrangement.

For example, operator terminal 20 can be arranged to contain an integrated telephone. Alternatively, operator terminal may be configured to support IP telephony communications. In other words, any arrangement that allows a customer service representative to engage in oral communications with caller 4 is sufficient. In addition, it is contemplated that system 2 is comprised of multiple operator terminals 20 such that more than one customer service representative is available to accommodate the users of system 2. It should be noted that primary ACD call center 16 and its communication with tandem switches 12 and operator terminals 20 as well as the arrangement and communication between primary ACD call center 16' can be implemented in accordance with the connectivity and communication techniques described in U.S. Pat. No. 6,404,884 issued on Jun. 11, 2002, the contents of which are incorporated herein by reference.

In an alternate embodiment of this invention it is contemplated that a caller 4 may interact with an agent using a non-voice method such as, but not limited to: Short Messaging Service (SMS), Wireless Application Protocol (WAP), live chat, and instant messaging.

Wide Area Network (WAN) 25 is configured to couple all operator terminals 20 between directory assistance systems 2 and 2'. This includes connections between geographic locations, such that operator terminals 20 located in directory assistance system 2 can connect with tandem switches 12 and POP routers 30 at other remote directory assistance system 2'. As noted earlier, and discussed in more detail below, because POP router 30 or ICM central controllers 34 may route calls to remote operator terminals 20' it is necessary that those operator terminals 20' be able to communicate back to the originating tandem switch 12 in order to connect to the proper call. WAN 25 is configured to relay call completion data to the appropriate tandem switch 12 in order to complete the call for caller 4.

In operation, WAN 25 allows customer service representatives at operator terminals 20' to transmit call completion data from operator terminals 20' to any one of the tandem switches 12 located in other directory assistance systems 2 or 2'.

It is noted that WAN 25 is only one example of a connectivity arrangement between directory assistance system 2 and system 2', however, this in no way is intended to limit the scope of the present invention. For example, in place of a privately operated Wide Area Network, system 2 and 2' may be connected via the public Internet or other public or a privately packet switched arrangement. For the purposes of illustration, WAN 25 has been used throughout as the default connectivity arrangement between directory assistance system 2 and system 2'.

As part of the call completion process, tandem switch 12 has the ability to select the optimal trunk group to be used for the completion of caller 4 to requested device 6. For example, if tandem switch 12 has a direct connection to the service provider 26 of requested device 6, the completion of this call would be implemented over this link.

In the case where tandem switch 12 does not have a direct connection to service provider 26 of requested device 6, the completion of this call would be via PSTN 10. This allows tandem switch 12 to select the most cost effective means of delivering the call to requested device 6.

Figure 3:
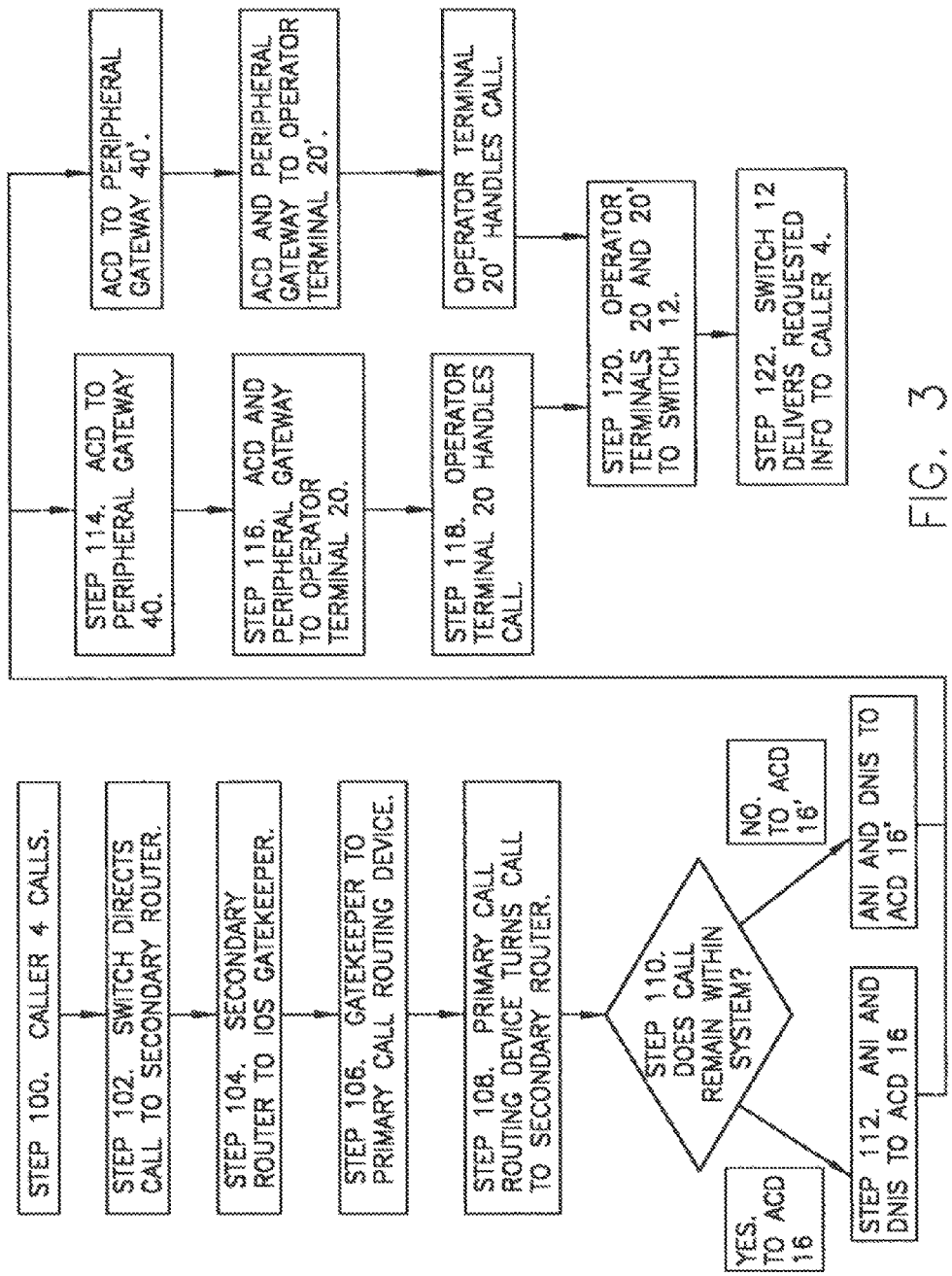
FIG. 3 is a flow diagram of the operation of the directory assistance system of FIG. 1, in accordance with one embodiment of the present invention.

In operation, as illustrated in FIG. 3, at step 100, a caller 4, places a call to directory assistance system 2 in order to receive information about or to be connected to a requested device 6, such as an individuals cellular phone. This call is received at tandem switch 12, where the call is converted into a digital signal.

Next, at step 102, tandem switch 12 collects the ANI (Automatic Number Identification) of caller 4 and forwards the information to secondary router/POP router 30 for initial routing of the call. At this point, if the system is operating under a normal first set of conditions, the call completion procedure proceeds to the next step. However, if POP router 30 either detects or is notified of a second set of conditions, such as problems with the ICM central controllers 34, a different call routing procedure is followed as described with reference to FIG. 4 and its accompanying description.

At step 104, appreciating that POP router 30 is operating under the first set of conditions, and the ICM central controllers are operating normally, the call information is forwarded to IOS gatekeeper 32 which translates the call from IP to ICM protocol. Next, at step 106, IOS gatekeeper 32 routes the call into primary call routing device/ICM central controllers 34, which recognizes the requests using GKTMP (Gatekeeper Transaction Message Protocol). ICM central controllers 34 then parses the DID (Direct Inward Dialing), appended to the call information by tandem switch 12, and decides whether the call is to be handled by either directory assistance system 2 where the call was first received or if it is to be handled by a remotely located directory assistance system 2'. This decision is based on any number of criteria, including but not limited to available agent skills, available number of agents, and average hold times and decisions on priority routing formulated by frequent caller routing module 37.

At step 108, after ICM central controllers 34 have decided how to handle the call, they return a terminating IP address to IOS gatekeeper 32, which in turn forwards the information back to POP router 30. Next, at step 110, depending on the decision made by ICM central controllers 34, POP router 30 either routes the call information to the primary ACD call center 16 within system 2, or alternatively, routes the call to primary ACD call center 16' in directory assistance system 2' via transfer routers/WAN routers 38 and 38', WAN 25 and POP router 30'.

Once the call reaches either primary ACD call center 16 or 16', the operations of the directory assistance systems are similar. As such, for the purposes of illustration, the call routing is described only with respect to system 2, however, it is understood to apply as well to the call routing within system 2' as well.

Next at step 112, primary ACD call center 16 receives ANI and DNIS (Dialed Number Identification Service) from POP router 30.

At step 114, primary ACD call center 16 forwards the call information to peripheral gateways 40 which in turn poll operator terminals 20 in real time to search for availability. Next, at step 116, after an operator terminal is selected, peripheral gateways 40, send the call information to the selected operator terminal 20. At the same time, primary ACD call center 16 forwards the call information to the same operator terminal 20.

It is noted that, the operation of directory assistance system 2 is not limited to transferring calls to operator terminals 20 in this respect. For example, it is within the contemplation of the present invention to use in-band signaling such that the information for the call is sent in-band with the call itself to operator terminal 20. However, for illustrative purposes, the call information is illustrated as being sent to operator terminals 20 via peripheral gateways 40.

At step 118, the agent at operator terminal 20 handles the call and retrieves the requested information from databases (not shown) within directory assistance system 2, Next, at step 120, operator terminal 20 sends a message to tandem switch 12 with the ANI of caller 4 and the number or connecting information for requested device 6 so that the call can be completed. It is noted that if an operator terminal 20' in system 2' handled the call, then to complete the call for caller 4 ANI and connecting information for requested device 6 is sent to tandem switch 12 via WAN routers 38 and 38' and WAN 25.

Finally at step 122, tandem switch 12 sends caller 4 the requested information, and also may send a message to service provider 26 to connect caller 4 to requested d vice 6.

This arrangement allows for intelligent load-balancing call distribution, decided by the ICM central controllers 34 to assign calls to operator terminals 20 within directory assistance system 2 as well as to operator terminals 20' in directory assistance system 2' when the call volume at system 2 becomes excessive.

However, as noted above, in certain situations, ICM central co rollers 34 sometimes experience down time or failure.

Figure 4:
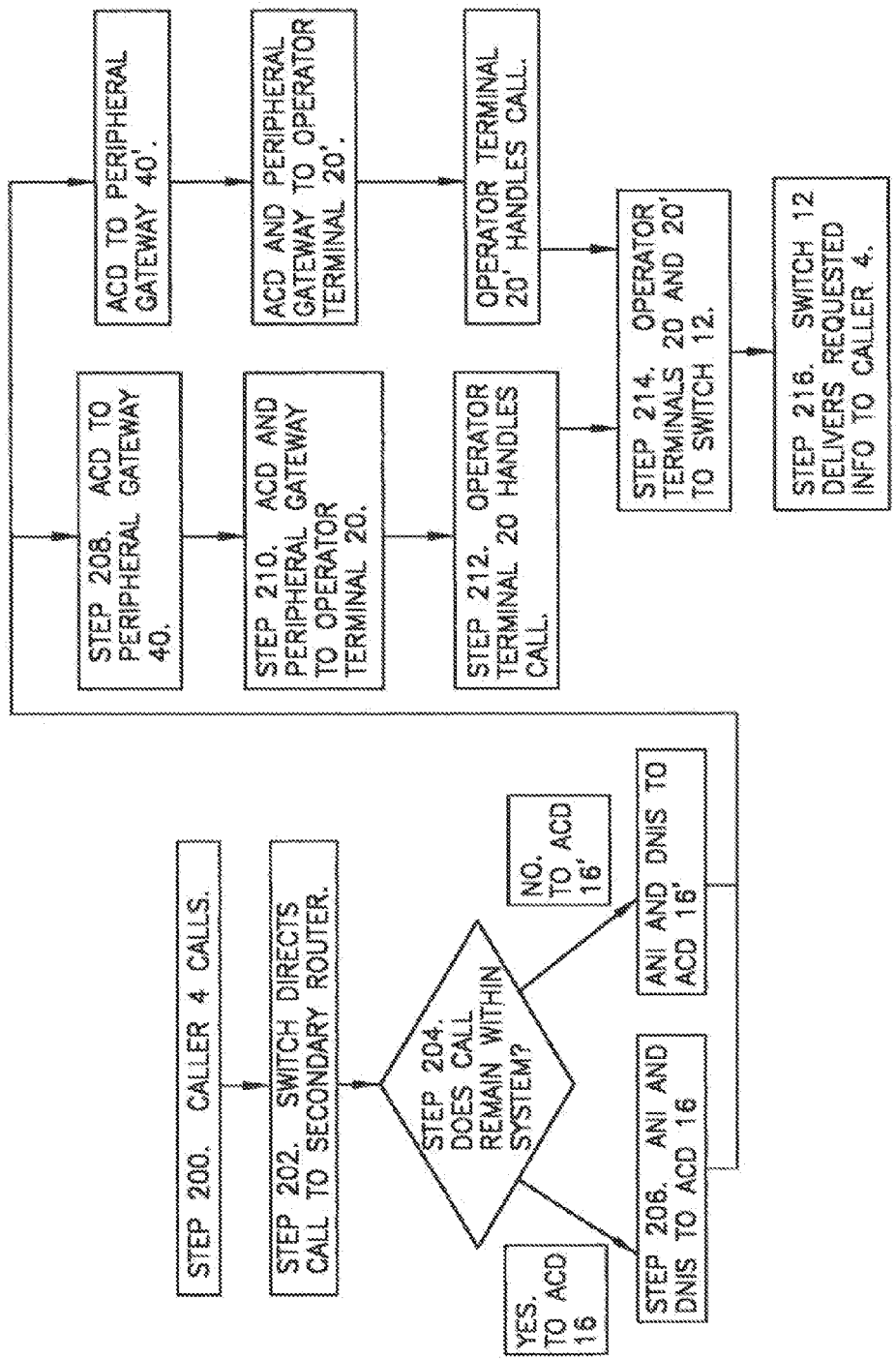
FIG. 4 is a flow diagram of the operation of the directory assistance system of FIG. 1, in accordance with another embodiment of the present invention.

In such instances, as illustrated in FIG. 4, directory assistance system 2 operates using a different load balancing call distribution technique.

First, at step 200, caller 4 places a call to directory assistance system 2 in order to receive information about or be connected to a requested device 6, such as an individual's cellular phone. This call is received at tandem switch 12, where the call is converted to a digital signal.

Next, at step 202, tandem switch 12 collects the ANI (Automatic Number Identification) of caller 4 and forwards the information to secondary router/POP router 30 for initial routing of the call. At this stage, POP router 30 discovers or is informed that primary call routing device/ICM central controllers 34 are not operating or are operating improperly.

At step 204, POP router assigns a designation IP address to each of the calls and either routes the call information to the primary ACD call center 16 within system 2, or alternatively, routes the call to primary ACD call center 16' in directory assistance system 2' via WAN routers 38 and 38', WAN 25 and POP router 30'.

For example, in the absence of load balancing routing decisions being made by ICM central controllers 34, POP router 30 may assume the role of distribution of incoming calls by sending every second call to a remote directory assistance system 2'. Using another distribution logic, POP router 30 may distribute calls by routing each successive call to a different directory assistance system 2 or 2' until every system 2 or 2' on WAN 25 has received one call. In such an instance, if there are 7 operating directory assistance systems 2 (1) and 2' (6), for each seven calls received at system 2, POP router 30 will keep one call and send the other six to each of the other systems 2', to be handled by their set of operator terminals 20'. The eighth incoming call would then start the distribution process over.

The methods of call distribution available to POP router 30, used when ICM central controllers 34 are down, are too numerous to convey in exact detail. Any similar counting method of distribution, used by POP router 30, when ICM central controllers 34 are inactive, is within the contemplation of the present invention.

Once the call reaches either primary ACD call center 16 or 16', the operations of the system are similar. As such, for the purposes of illustration the call routing will be described on with respect to system 2, however, it is under stood to apply as well to the call routing within system 2' as well.

Next at step, 206, primary ACD call center 16 receives the ANI and DNIS (Dialed Number Identification Service) from POP router 30. At step 208, primary ACD call center 16 forwards the call information to peripheral gateways 40 which in turn poll operator terminals 20 in real time to search for availability. Next, at step 210, after an operator terminal 20 is selected, peripheral gateways 40, send the call information to the selected operator terminal 20. At the same time, primary ACD call center 16 forwards the call information to the same operator terminal 20.

At step 212, the agent at operator terminal 20 handles the call and retrieves the requested informal on from databases within directory assistance system 2. Next, at step 214, operator terminal 20 sends a message to tandem switch 12 with the ANI of caller 4 and the number or connecting information for requested device 6 so that the call can be completed. It is noted that if an operator terminal 20' in system 2' handled the call, then to complete the call the caller 4 ANI and connecting information for requested device 6 is sent to tandem switch 12 via WAN routers 38 and 38' and WAN 25.

Finally at step 216, tandem switch 12 sends caller 4 the requested information, and also may send a message to service provider 26 to connect caller 4 to requested device 6. This procedure is followed for all incoming calls to directory assistance system 2, until POP router 30 is either informed or discovers that ICM central controllers 34 are back on line, at which time directory assistance system 2 reverts to operate under the previously described call distribution process as set forth in FIG. 2.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A communication routing system for use in directory assistance system, said routing system comprising:
   a primary communication routing device at a first operator terminal center in the directory assistance system configured to receive directory assistance communications from requesters at a first directory assistance system, and to determine, for each of said communictaions, whether said communictaions will be handled by said first operator terminal center, or by a second operator terminal center in said directory assistance system among a plurality of operator terminal centers; and
   a secondary router at said first operator terminal center in said directory assistance system, said secondary router configured to initially route said communications within said first operator terminal center to said primary communication routing device, and
   wherein if said primary communication routing device is off-line, said secondary router employs a second default communication distribution process to route said communications among said first operator terminal center, and said plurality of operator terminal centers including said second operator terminal center in said directory assistance system.

2. The communication routing system as claimed in claim 1, wherein said secondary router further maintains a means for determining the online/off-line status of said primary communication routing device.

3. The routing system as claimed in claim 1, further comprising a transfer router, said transfer router configured to transfer communications between said first operator terminal center and a second operator terminal center in said directory assistance system via a Wide Area Network (WAN).

4. The routing system as claimed in claim 3, wherein said primary operator terminal routing device routes a portion of said plurality of said incoming communications to said second operator terminal center when said first operator terminal center in said directory assistance system is experiencing high operator terminal volume.

5. The routing system as claimed in claim 3, wherein said secondary router routes a portion of said plurality of said incoming communications to said second operator terminal center in said directory assistance system when said primary communication routing device is off line.

6. The routing system as claimed in claim 3, further comprising an automatic communication distribution operator terminal center, configured to receive a portion of said plurality of communications from said secondary router and distribute them among a plurality of operator terminals disposed within said first operator terminal center in said directory assistance system.

7. The routing system as claimed in claim 6, wherein said second operator terminal center in said directory assistance system further comprises a second automatic communication distribution operator terminal center configured to receive a portion of said plurality of communications from said secondary router and distribute them among a plurality of operator terminals disposed within said second operator terminal center.

* * * * *